United States Patent [19]

Rzepecki et al.

[11] 4,363,071

[45] Dec. 7, 1982

[54] STATIC DISSIPATIVE MAT

[75] Inventors: Ray M. Rzepecki, North Scituate, R.I.; Victor H. Weiss, Bridgeport, Conn.

[73] Assignee: Pervel Industries, Inc., Plainfield, Conn.

[21] Appl. No.: 243,776

[22] Filed: Mar. 16, 1981

[51] Int. Cl.$^3$ ............................................. B32B 5/18
[52] U.S. Cl. ..................................... 361/220; 428/922
[58] Field of Search ....................... 361/212, 216, 220; 428/323, 408, 424.6, 922; 252/500, 502

[56] References Cited

U.S. PATENT DOCUMENTS 4,301,040  11/1981  Berbeco ........................... 361/212 X
4,307,144  12/1981  Sanders et al. ................. 428/922 X

FOREIGN PATENT DOCUMENTS 2824739  2/1979  Fed. Rep. of Germany ...... 428/922

Primary Examiner—Harry E. Moose, Jr.
Attorney, Agent, or Firm—Hopgood, Calimafde, Kalil, Blaustein & Judlowe

[57] ABSTRACT

The invention contemplates a multi-layer electrically conductive web or mat for safely and quickly discharging personnel-accumulated static electricity. An upper continuous polymeric layer of relatively low conductivity, in the order of $10^8$ ohms per square, is bonded to an underlying continuous polymeric layer of much greater conductivity, in the order of $10^2$ ohms per square, and provision is made for electrically grounding the underlying layer, illustratively by casting to the intermediate layer a continuous bottom layer of expanded polymeric material of relatively low conductivity.

8 Claims, 9 Drawing Figures

TOP CONTINUOUS VINYL LAYER
(HIGH VOLUME RESISTIVITY)

CONDUCTIVE INNER LAYER
(LOW SURFACE RESISTANCE)

NON-SKID CONDUCTIVE
VINYL BACKING
(HIGH VOLUME RESISTIVITY)

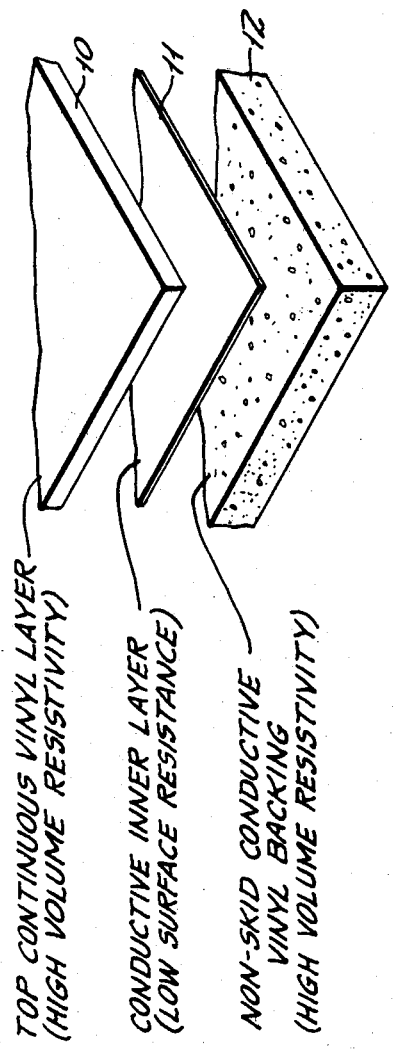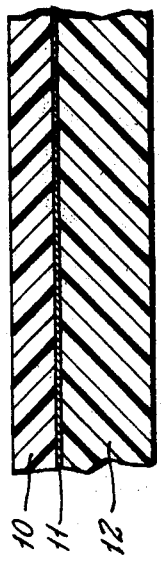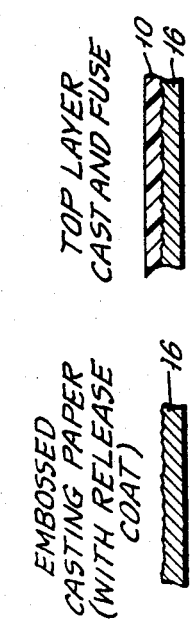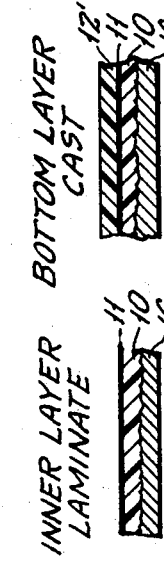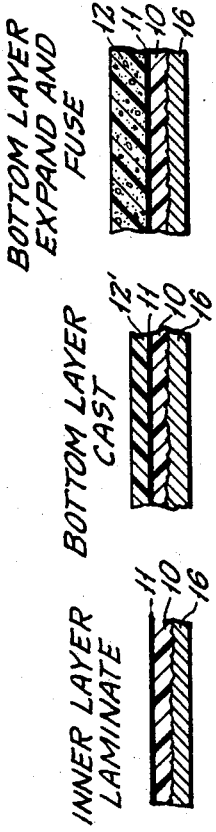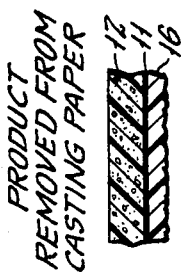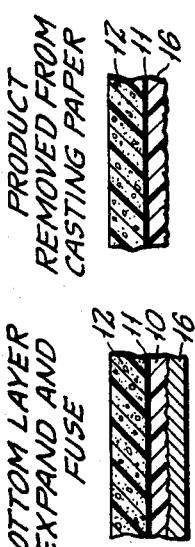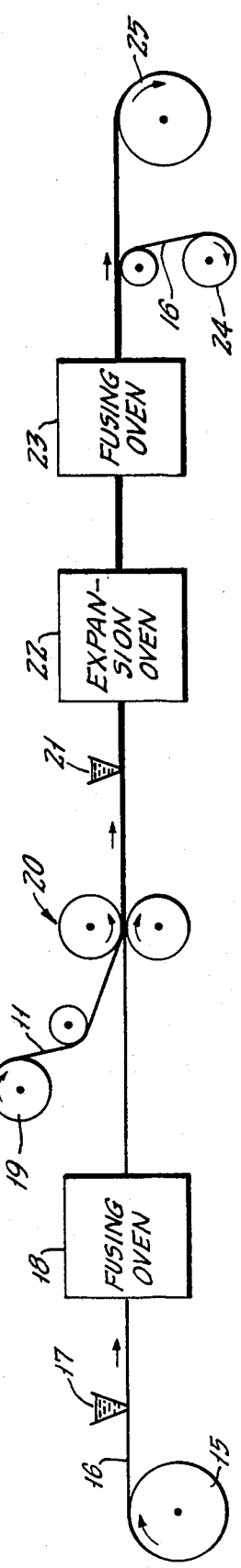

STATIC DISSIPATIVE MAT

BACKGROUND OF THE INVENTION

The invention relates to a static-dissipative web construction, suitable for example as a floor mat to enable personnel-accumulated static electricity to safely discharge from a person standing on the mat.

Various static-discharge mat constructions have been proposed, ranging from such highly conductive configurations as to permit the hazard of substantially instantaneous discharge, to slow-leaking constructions which exhibit undesirable dependence upon ambient humidity. Between these extremes, U.S. Pat. No. 4,208,696 to Lindsay, et al. describes a multi-layer static-dissipative web wherein an open-weave fabric in the form of cotton scrim is rendered electrically conductive (using carbon in a latex binder) and is interposed between upper and lower layers of relatively low conductivity, to produce mat constructions having an overall volume resistivity between $10^{10}$ and $10^{11}$ ohm-cm and surface resistance in the order of $10^8$ ohms per square; Lindsay et al. predicate their results on the foraminous nature of their conductive open-weave fabric. While the Lindsay, et al. product is in many respects satisfactory, it is prone to delamination, and for many applications an order of magnitude reduction in surface resistance is desirable, i.e., to the order of $10^7$ ohms per square.

BRIEF STATEMENT OF THE INVENTION

It is an object of the invention to provide an improved static-dissipative web or mat of the character indicated.

It is a specific object to produce such a web or mat that is inherently not prone to delamination and which exhibits a surface resistance in the order of $10^7$ ohms per square, as measured pursuant to ASTM Standard D257-76.

A general object is to provide such a web or mat construction which is of relative simplicity, which uses readily controllable and available component materials, and which is inherently relatively insensitive to environmental humidity.

The invention achieves the foregoing objects by employing a thin continuous film of graphite-compounded polymeric material such as a bonded conductive flexible plate on the underside of the upper polymeric layer of low conductivity, the thin film having a surface resistance in the order of $10^2$ ohms per square, as measured pursuant to said ASTM Standard D257-76. By employing polymeric material of the same nature, e.g., polyvinyl chloride in both these layers, as well as in an expanded conductive cushioning bottom layer, laminar bonding is optimized, and sensitivity to varying humidity is minimized. Also, the continuous nature of all layers, and the continuous nature of their interface bonding, provides a continuous volume within which electrostatic charge may dissipate and distribute over the thin film of the conductive intermediate layer, as distinguished from the discrete paths in which charge dissipation must be channeled in the foraminous-scrim network configuration of Lindsay, et al.

DETAILED DESCRIPTION

The invention will be described in detail for a preferred embodiment, in conjunction with the accompanying drawings, in which:

FIG. 1 is an enlarged sectional view through a mat construction of the invention;

FIG. 2 is an exploded view in perspective, to permit better identification of components of the construction of FIG. 1;

FIGS. 3a to 3f are views similar to FIG. 1, to illustrate successive stages in fabrication of the construction of FIG. 1; and FIG. 4 is a schematic diagram to illustrate steps in a continuous process for making the construction of FIG. 1.

In FIGS. 1 and 2, the invention is shown in the form of a static-dissipating web or mat comprising three bonded layers 10–11–12 of differently conductive polymeric material, such as polyvinyl chloride. The top or upper layer 10 and the bottom or lower layer 12 may each be of the same solid-cast construction, but as shown, the lower layer 12 is an expanded version of the same polymeric material; and both layers 10–12 incorporate one or more conductive ingredients to enable each of layers 10–12 to have a volume resistivity in the range $10^7$ to $10^{12}$ ohm-cm. The inner or intermediate layer 11 is a thin film of preferably the same polymeric material containing an electrically conductive ingredient such as carbon black and exhibiting a surface resistance in the order of $10^2$ ohms per square, as measured pursuant to ASTM Standard D257-76. A highly satisfactory conductive vinyl film for use at conductive layer 11 is known as Condulon, a trademark and product of Pervel Industries, Inc., Plainfield, Connecticut.

In a specific illustrative example, the solid upper and expanded lower layers 10–12 are both of polyvinyl chloride, with added conductive plasticizer, which may be commercially available products known as Markstat AL-15 or di-octyl-adipate (DOA)*, or a combination of the two. If mixed, it is preferred that the proportion by weight of the AL-15 to the DOA be 2:1, their combination accounting for 12 percent of the total dry-ingredient mix. In the illustrative example, the solid top layer 10 was 35 mils thick, the inner layer 11 was 2 mils thick, and the expanded lower layer was 88 mils thick, for an overall thickness of 125 mils. The upper and lower layers each exhibited a volume resistivity of about $10^9$ ohm-cm and a surface resistance of $10^8$ ohms per square, and the surface resistivity of the intermediate layer was 300 ohms per square. Overall surface resistance of the consolidated mat was measured at the exposed surface of top layer 10 to be $10^7$ ohms per square, and the time for discharge of a 5 kV potential was 0.05 second, for a decay to ten percent of the original charge, per Federal Test Method Standard No. 101B, Method 4046.

*Markstat AL-15 is a product of Argus Division, Witco Chemical Company, Brooklyn, N.Y.; and DOA is available from various sources, including Monsanto, St. Louis, Mo.

Continuous manufacture of the described web will be described in connection with FIGS. 3 and 4, commencing with a supply reel 15 of suitable casting web 16 continuously advancing from left to right, in the sense of FIG. 4. The casting web 16 may be a release-coated fabric or paper, and in the latter event the casting surface thereof is preferably embossed (as in FIG. 3a), for ultimate aesthetic purposes at the exposed upper surface of layer 10.

A first casting of liquid-mixed polymeric-coat ingredients is made at 17 and the same is cured or fused at 18, thereby establishing the solid layer 10 atop the casting paper 16, as shown in FIG. 3b. A separate supply of conductive film for inner layer 11 is available from a reel 19 and is guided for bonded lamination to layer 10, under heat and pressure, at heated squeeze rolls 20, to produce intermediate product shown in FIG. 3c. A second casting of liquid-mixed polymeric-coat ingredients (this time with an expanding component) is then made at 21, so that the developing product appears as in FIG. 3d, wherein the numeral 12' will be understood to designate the as-yet unexpanded liquid coat applied at 17. Passage through an expanding oven 22 enables controlled uniform expansion of the coat 12' to its ultimate thickness, as bottom layer 12, the same being consolidated in a fusing oven 23, with the appearance shown in FIG. 3e. The product is now completed by stripped removal of the casting paper and its separate accumulation at 24, leaving finished product (FIG. 3f) available for reel accumulation at 25.

Static-dissipating vinyl mat material, produced as described is found to meet all stated objects. Static-dissipating conductivity is an order of magnitude (i.e., 10 times) better, that is, a surface resistance of $10^7$ ohms per square, as compared with $10^8$ ohms per square of a vinyl product of the Lindsay, et al. patent, and delamination is virtually impossible. Ambient humidity, and/or water immersion are found to have no significant effect on electrical properties. The inherent capability of Condulon to discharge a 5 kV charge in 0.02 second enables design modification to increase the speed of electrostatic discharge, from the 0.05 second time observed for the described mat, either by creating a less-thick top layer 10 or by increasing the proportion of conductive plasticizer in the low-conductivity layers 10-12. Generally, the thickness range of layer 10 may be between 25 and 50 mils, the thickness range of layer 11 may be between 1 and 5 mils, and the thickness range of layer 12 may be between 25 and 125 mils, expansion being optional and dependent upon ultimate use.

While the invention has been described in detail for the preferred embodiment, it will be understood that modifications may be made without departing from the scope of the invention.

What is claimed is:

1. A three-ply conductive web for dissipating a static electric charge impressed thereon, comprising an upper layer of thermoplastic polymeric material having a volume resistivity of $1 \times 10^7$ to $1 \times 10^{12}$ ohm-cm, a thin conductive film of thermoplastic polymeric material laminated directly to said upper layer and having a surface resistance in the order of $10^2$ ohms per square, and a conductive underlying lower layer of expanded thermoplastic polymeric material in direct electrical contact with said conductive film and having a volume resistivity of $1 \times 10^7$ to $1 \times 10^{12}$ ohm-cm.

2. In a multi-layer conductive web for discharging a static electric charge impressed thereon, wherein an upper layer of thermoplastic polymeric material having a volume resistivity of $1 \times 10^7$ to $1 \times 10^{12}$ ohm-cm is in direct physical and electrical connection with a more conductive underlying layer, and wherein conductive means in electrical contact with said underlying layer is provided to connect said underlying layer to ground potential, the improvement wherein said underlying layer is a continuous thin conductive film of thermoplastic polymeric material having a surface resistance in the order of $10^2$ ohms per square, whereby the surface resistivity of the web as measured on the upper surface of said upper layer is in the order of $10^7$ ohms per square, said conductive means in electrical contact with said underlying layer being a layer of expanded thermoplastic polymer having a volume resistivity of $1 \times 10^7$ to $1 \times 10^{12}$ ohm-cm.

3. The improvement of claim 2, in which the thermoplastic polymeric materials of each said upper layer and said underlying layer comprises essentially solid plasticized polyvinyl chloride with a conductive ingredient compounded therein, the conductive ingredient of said upper layer being a salt and the conductive ingredient of said underlying layer being carbon black.

4. The improvement of claim 3, in which the thickness of said underlying layer is in the range of 1 to 5 mils, and the thickness of said upper layer is in the range of 25 to 50 mils.

5. The improvement of claim 4, in which the thickness of said underlying layer is substantially 2 mils.

6. The improvement of claim 5, in which said underlying layer has a surface resistance of substantially 300 ohms per square.

7. In a multi-layer conductive web for discharging a static electric charge impressed thereon, wherein an upper layer of thermoplastic polymeric material having a volume resistivity of $1 \times 10^7$ to $1 \times 10^{12}$ ohm-cm is in direct physical and electrical connection with a more conductive underlying layer, and wherein conductive means in electrical contact with said underlying layer is provided to connect said underlying layer to ground potential, the improvement wherein said underlying layer is a continuous thin conductive film of thermoplastic polymeric material having a surface resistance in the order of $10^2$ ohms per square, whereby the surface resistivity of the web as measured on the upper surface of said upper layer is in the order of $10^7$ ohms per square, said conductive means comprises a bottom layer of expanded plasticized polyvinyl chloride with a conductive compound therein and having a volume resistivity of $1 \times 10^7$ to $1 \times 10^{12}$ ohm-cm.

8. As an article of manufacture, a multi-layer static-dissipating floor mat, comprising an upper layer level of solid electrically conductive plasticized polyvinyl chloride having a volume resistivity of $10^7$ to $10^{12}$ ohm-cm, an intermediate layer of thin continuous solid electrically conductive plasticized polyvinyl chloride having a surface resistance in the order of $10^2$ ohms per square, and a bottom layer of expanded electrically conductive plasticized polyvinyl chloride having a volume resistivity of $10^7$ to $10^{12}$ ohm-cm.

* * * * *